(12) United States Patent
Laraway et al.

(10) Patent No.: US 7,718,069 B2
(45) Date of Patent: *May 18, 2010

(54) WATER TREATMENT PROCESS FOR OILFIELD PRODUCED WATER

(75) Inventors: James W. Laraway, West Jordan, UT (US); Richard E. Weber, Zephyrhills, FL (US); Donald J. Thomas, Tooele, UT (US)

(73) Assignee: Water & Power Technologies, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/405,781

(22) Filed: Mar. 17, 2009

(65) Prior Publication Data

US 2009/0173692 A1    Jul. 9, 2009

Related U.S. Application Data

(63) Continuation of application No. 11/999,582, filed on Dec. 6, 2007, now Pat. No. 7,520,993.

(51) Int. Cl.
*B01D 61/00* (2006.01)
*C02F 1/44* (2006.01)
*A61M 1/16* (2006.01)
*B01J 30/00* (2006.01)

(52) U.S. Cl. .................. 210/652; 210/650; 210/639; 210/767; 210/749; 210/660; 210/195.2; 210/175; 210/766; 210/805; 96/234; 166/260

(58) Field of Classification Search .................. 210/639, 210/650–652, 767, 272, 175, 805, 195.2, 210/749, 766; 97/234; 166/266; 96/234
See application file for complete search history.

(56) References Cited

U.S. PATENT DOCUMENTS

| 6,113,797 A * | 9/2000 | Al-Samadi .................. 210/652 |
| 6,733,636 B1 * | 5/2004 | Heins ............................. 203/1 |
| 7,438,129 B2 * | 10/2008 | Heins ........................ 166/266 |
| 7,520,993 B1 * | 4/2009 | Laraway et al. ............. 210/652 |

OTHER PUBLICATIONS

Alai, et al. "Evaporative evolution of a Na-Cl-NO$_3$-K-Ca-SO$_4$-Mg-Si brine at 95° C: Experiments and modeling relevant to Yucca Mountain, Nevada." Geochemical Transactions, vol. 6, No. 2, pp. 31-45. Jun. 2005.

(Continued)

*Primary Examiner*—Ana M Fortuna
(74) *Attorney, Agent, or Firm*—Morriss O'Bryant Compagni

(57) ABSTRACT

The invention relates to a method and system for treating an aqueous liquid containing dissolved minerals and dissolved hydrocarbons. Method steps and apparatus for treating a waste water feed stream are disclosed which utilize a warm lime softening system in fluid communication with the waste water feed stream, wherein sludge from the warm lime softening system is recycled to improve lime utilization and enhance silica and boron removal without the addition of an external source of magnesium. In addition, a microfiltration system and/or an air stripper system may be used in fluid communication with at least one reverse osmosis system to produce a treatment water that meets state and federal guidelines for surface discharge.

17 Claims, 4 Drawing Sheets

OTHER PUBLICATIONS

Allegrezza, Jr. "Commercial Reverse Osmosis Membranes and Modules." Bipin S. Parekh (Ed.) *Reverse Osmosis Technology—Applications for High-Purity-Water Production*. Chapter 2, pp. 53-120, 1988.
Bridle, Michael K. "Esso's Experience with Produced and Waste Water Recycle Systems." Esso Resources Canada Limited. Energy Processing/Canada, pp. 8, 29-32 Sep.-Oct. 1986.
Cadotte, John E. "Evolution of Composite Reverse Osmosis Membranes." 1985 American Chemical Society. FilmTec Corporation, Minneapolis, MN 55435.
Desilva, Francis J. "Essentials of Ion Exchange." $25^{th}$ Annual WQA Conference Mar. 17, 1999.
Doran and Leong. "Developing a Cost Effective Environmental Solution for Produced Water and Creating a 'New' Water Resource." ARCO Western Energy, 4550 California Ave., Bakersfield, CA 93302. Apr. 28, 1997.
Doran. "Developing a Cost Effective Environmental Solution for Produced Water and Creating a 'New' Water Resource." ARCO Western Energy, 4550 California Ave., Bakersfield, CA 93302. May 2000.
Dorr-Oliver Eimco. "EIMCO® MAXR™ Treatment Process—Maximum Removal of Soluble Species Using Physical Chemical Treatment". GL&V EMC 3330, 2003.
Dyke, et al. "Removal of Salt, Oil, and Boron from Oil Field Wastewater by High pH Reverse Osmosis Processing." Sep. 1992.
Fritz and Tiwari. "An Economical New Zero Liquid Discharge Approach for Power Plants." Power-Gen International, Dec. 10-12, 2002.
Fritz and Nathan. "Hero Process—Recovery/Reuse of Cooling Tower Blowdown and as a Preconcentrator for ZLD Application.", 2001.
Goldberg and Glaubig. "Boron Adsorption on Aluminum and Iron Oxide Minerals." Soil Sci. Soc. Am. J., vol. 49, pp. 1374-1379, 1985.
Gunnarsson, et al. "Magnesium-silicate scales in geothermal utilization. An experimental study." Science Institute University of Iceland RH-06-02. Apr. 2002.
Idelovitch, et al. "The Role of Groundwater Recharge in Wastewater Reuse: Israel's Dan Region Project." American Water Works Association. Research and Technology Jounral AWWA, pp. 391-400, Jul. 1980.
Infilco Degremont. "Borate Rejection by B-9 Permeators." Dec. 19, 1990.
Jun, et al. "Semiconductors—High-Purity Water System Upgrade in Singapore Using High-Efficiency RO." UltraPure Water® May/Jun. 2004, pp. 27-30.
Koch Membrane Systems. "Fluid Systems® TFC®—XR 8" Elements—Extra High Rejection RO Elements for Brackish Water. 2005, 1991.
Lurie, et al. "Applying Reverse Osmosis in Dilute Fluoride-waste Treatment." Solid State Technology Mar. 2005 Online. www.solid-state.com. Tower Semiconductor Ltd., Migdal Haemek, Israel.
LNSP Nagghappan. "Desalination of Produced Water Using OPUS Technology" SPE Thermal and Facilities Study Group Luncheon, Jan. 9, 2007, Bakersfield, CA, Petroleum Club. International Water Conference 2006.
Mcbride, Sr., and Mukhopadhyay. "Semiconductors—High Water Recovery and Solute Rejection Through a New RO Process." UltraPure Water® May/Jun. 1997, pp. 24-27.
National Drinking Water Clearinghouse. "Membrane Filtration." Tech Brief 10, Mar. 1999.
Nebgen, et al. "The Alumina-Lime-Soda Water Treatment Process." Research and Development Progress Report No. 820. United States Department of the Interior. Jan. 1973.
Parks and Edwards. "Boron in the Environment." Critical Reviews in Environmental Science and Technology, 35:81-114, 2005. Taylor & Francis, Inc.
Parks and Edwards. "Boron Removal via Formation of Magnesium Silicate Solids during Precipitative Softening." Journal of Environmental Engineering, Feb. 2007, pp. 149-156.
Parks and Edwards. "Precipitative Removal of As, Ba, B, Cr, Sr, and V Using Sodium Carbonate." Journal of Environmental Engineering pp. 489-496, May 2006.
Project Clean Water. "Analyte Benchmarks." Science and Technology TAC Attachment G, pp. 1-15, Jun. 2001.
Recepoglu and Beker. "A Preliminary Study on Boron Removal from Kizildere/Turkey Geothermal Waste Water." Geothermics, vol. 20, No. 1/2, pp. 83-89, 1991. Pergamon Press plc.
Rigdon, Lester. "Defluoridation Study for Boise Geothermal Water." Lawrence Livermore Laboratory. Jun. 3, 1980.
Sauer, et al. "Semiconductors—Boron Removal Experiences at AMD." UltraPure Water® May/Jun. 2000, pp. 62-68.
Scott, et al. "Fluoride in Ohio Water Supplies—Its Effect, Occurrence and Reduction." J.A.W.W.A. vol. 29, No. 1, pp. 9-25, 1988.
Stoessell, R. K. "25° C and 1 atm Dissolution Experiments of Sepiolite and Kerolite." Geochimica et Cosmochimica Acta vol. 52, pp. 365-374. Pergamon Journals Ltd. 1988.
Tao, et al. "Conversion of Oilfield Produced Water Into an Irrigation/Drinking Quality Water." Society of Petroleum Engineers (SPE) 26003, pp. 571-579, Mar. 1993.
Toray Membrane America, Inc. "Toray Seawater RO Elements TM800." 12520 High Bluff Drive, Suite 120, San Diego, CA 92130. Feb. 2004.
USFilter Corporation. "Auto-Shell™ Filter: Walnut Shell Filtration". www.zimpro.usfilter.com . 2005.
Vandeventer, et al. "Innovative Processes Provide Cogeneration Power Plant with the Ability to Utilize Oil Field Water." With Prepared Discussion by R. Gregory Balmer. $50^{th}$ Annual Meeting of the International Water Conference, Pittsburgh, PE, Oct. 23-25, 1989.
Waggott, A. "An Investigation of the Potential Problem of Increasing Boron Concentrations in Rivers and Water Courses." Water Research, vol. 3, pp. 749-765. Pergamon Press 1969.
Zalewski, et al. "Produced Water Recycling at BP Resources—Petro Canada's Wolf Lake Plant." Mar. 14, 1991.
Aronovitch and Ford. "Weakly Acidic Cation Performance Treating Water Containing High Iron." Ultrapure Water. vol. 12, No. 4, pp. 60, 62-64. May/Jun. 1995.
Auerswald. "Optimizing the Performance of Reverse Osmosis/Continuous Electrodeionization System." Ultrapure Water, pp. 34-52, May/Jun. 1996.
Crabbe. "A Double Pass Reverse Osmosis System." Industrial Water Engineering, vol. 13, No. 6, Dec. 1976/Jan. 1977. (Adapted from a paper delivered at the "Second Annual Conference on New Advances in Separation Technology" Cherry Hill, NJ, Sep. 24, 1976.).
HYDRANAUTICS. "Membrane Element 4040-LST-CPA2." 1994.
FilmTec Corporation. "4" Brackish Water Element Specifications." Technical Bulletin, Jan. 1984.
FilmTec Corporation. "4" Brackish Water RO Element Specifications." Technical Bulletin, Dec. 1982.
FilmTec Corporation. "8" Brackish Water RO Element Specifications." Technical Bulletin, Dec. 1982.
FilmTec Corporation (The Dow Chemical Company). "FilmTec Membranes, Membrane System Design Guidelines," Product Information, Mar. 1996.
FilmTec Corporation (The Dow Chemical Company). "FilmTec Membranes, FT-30 Membrane Description," Technical Bulletin, Dec. 1992.
FilmTec Corporation. "FilmTec Membrane Elements: System Design, Introduction to Reverse Osmosis, Water Chemistry and Pretreatment." Technical Manual, pp. 1, 9, 11, 13-14, Apr. 1995.
Handbook of Membrane Technology, Jul. 15, 1985, pp. 184-198.
Idelovitch and Wachs. "Magnesium Recycling by Carbonation and Centrifugation of High-lime Wastewater Sludge." Journal WPCF (Water Pollution Control Federation), vol. 55, No. 2, pp. 136-144 (XP-002092114), Feb. 1983
Miyahara, et al. "Practical Ion Exchange," Jan. 1, 1972, published by Kagaku Kogyo Ltd., pp. 99-102.
Okay, et al. "Boron Pollution in the Simav River, Turkey and Various Methods of Boron Removal." Water Research vol. 19, No. 7, p. 857-862, 1985.
Parks and Abrams. "Fundamentals of Ion Exchange in Water Treatment." Presented at the $7^{th}$ Annual Liberty Bell Corrosion Conference, 1969. Heating, Piping and Air Conditioning (HPAC Engineering), vol. 42, No. 8, pp. 98-102, Aug. 1970.
Petersen, et al. "Development of the FT-30 Thin-Film Composite Membrane for Desalting Applications." National Water Supply Improvement Association, 8th Annual Conference and International Trade Fair, San Francisco, California, Jul. 6-10, 1980.

Shikoku Electric Power Co., Ltd., "Annual Research Report No. 42," Sep. 1983.

Turek. "The Influence of Magnesium Hydroxide Precipitation Conditions on the Boron Content." Polish Journal of Applied Chemistry, pp. 211-213, 1995 (XP-002092123).

U.S. Filter Corporation. "FlexRO® Reverse Osmosis Systems." 1995.

Wong. "Boron Control in Power Plant Reclaimed Water for Potable Reuse." Environment Progress, vol. 3, No. 1, pp. 5-11, Feb. 1984.

Zosui Gijutsu (Water Producing Technology) vol. 10, No. 2, pp. 13-22, 1984.

Abdel-Wahab, et al., "An Equilibrium Model for Chloride Removal from Recycled Cooling Water Using the Ultra-High Lime with Aluminum Process," Water Environment Research, vol. 77, No. 7, pp., 2005.

Abdel-Wahab and Batchelor, "Chloride Removal from Recycled Cooling Water Using Ultr-High Lime with Aluminum Process," Water Environment Research, vol. 74, No. 3, pp. 256-263, May/June.

Abdel-Wahab and Batchelor, "Effects of pH, Temperature, and Water Quality on Chloride Removal with Ultra-High Lime with Aluminum Process," Water Environment Research, vol. 78, No. 9, 2006.

Abdel-Wahab and Batchelor, "Interactions Between Chloride and Sulfate or Silica Removals Using an Advanced Lime-Aluminum Softening Process," Water Environment Research, vol. 78, No. 13, pp. 2006.

Abdel-Wahab and Batchelor, "Interactions Between Chloride and Sulfate or Silica Removals from Wastewater Using an Advanced Lime-Aluminum Softening Process: Equilibrium Modeling," Water, May 2007.

Batchelor and Mcdevitt, "An innovative process for treating recycled cooling water," Journal WPCF, vol. 56, No. 10, pp. 1110-1117, Oct. 1984.

Batchelor, et al., "Removal of Sulfate from Recycled Cooling Water by the Ultra-High Lime Process," Water Reuse Symposium III, 1985.

Batchelor, et al., "Technical and economic feasibility of ultra-high lime treatment of recycled cooling water," Research Journal WPCF, vol. 63, No. 7, pp. 982-990, Nov./Dec. 1991.

Okey and Coombs, "Enhanced Silica Removal in Solids Contact Systems," EIMCO Process Equipment Company, Salt Lake City, Utah, pp. 1-26, Jun. 1985.

Rautenbach, "Membranverfahren" 1997, Springer-Verlag, Berlin, XP002508147, pp. 152-154.

* cited by examiner

WATER TREATMENT PROCESS FOR OILFIELD PRODUCED WATER

This application is a continuation of U.S. application Ser. No. 11/999,582, filed Dec. 6, 2007, the disclosure of which is incorporated herein by reference in its entirety.

TECHNICAL FIELD

The invention relates to the removal of solutes from an aqueous solvent, more particularly, to the removal of solutes present in oil field produced water to a level sufficient to meet state and/or federal requirements for discharge of the treated water.

BACKGROUND

As oil supplies diminish the need for improved recovery methods continually increases. One of the predominant methods used to improve viscous or heavy crude oil recovery involves injecting steam into the oil well, see U.S. Pat. No. 5,080,172. Injecting steam into a well results in recovery of an oil/water mixture, where the water is typically removed from the oil and then contaminated produced water is lightly treated and recycled as poor quality steam back into the formation. This eventually results in an increase of the injection pressures over time as the recycled water builds up in the formation and eventually blocks the movement and recovery of known oil reserves in the formation. As a result, the produced water eventually has to be disposed of to decrease the volume of water in the formation and in turn improve production. However, disposal of this produced water is problematic due to the presence of a large number of solutes, including minerals and organic compounds, which requires that the produced water be injected underground at a remote site or treated for surface discharge.

With increasing water quality standards, surface discharge of the produced water has become even more problematic and has produced a need for methods to treat the produced water prior to discharge. In addition, the loss of drinking and/or irrigation water in arid regions presents a motivation to reclaim the produced water to a purity level allowing above ground disposal.

Unfortunately, the solutes present in produced water vary depending upon its origin and the particular characteristics of the oil well site. This has made the standardization of water treatment facilities difficult, if not impossible. California has imposed standards for irrigation water that require removal of certain elements or compounds to levels below those of the initial source water, see U.S. Pat. No. 5,250,185. In light of these difficulties, there is a need in the art for a water treatment method that removes the various solutes to levels that are acceptable for surface discharge under various state and/or federal regulations, particularly the California regulations.

SUMMARY OF THE INVENTION

The present invention comprises a method and system for treating an aqueous liquid containing dissolved minerals and dissolved hydrocarbons. In an exemplary embodiment, the method comprises passing an aqueous liquid containing dissolved minerals and dissolved hydrocarbons through a warm lime softener at a pH of about 11, wherein the effluent from the warm lime softener may have the pH adjusted to about 9 with an acid to minimize the continued precipitation of insoluble compounds before passing the effluent through a microfiltration system prior to contacting a reverse osmosis system.

In another exemplary embodiment, the method further includes one or more of the following: an ion exchange resin based softener in fluid communication with a microfiltration system; recycling at least a part of a precipitate sludge produced by the warm lime softener back into the warm lime softener; maintaining the temperature of the aqueous liquid in the warm lime softener between about 170° F. and about 210° F. (or about 180° F.) (e.g., by installing insulation around the warm lime softener); passing an effluent from the reverse osmosis system through an air stripper; raising the pH of an effluent from a microfiltration system to a pH of about 11 before contacting the reverse osmosis system; passing the effluent from a warm lime water softener through a media filter comprising anthracite, walnut shells, garnet or similar media and combinations thereof; a second reverse osmosis system following the air stripper; neutralizing the pH of the effluent from the air stripper system to a pH of about 7; producing a discharge water meeting California irrigation water regulations; and combinations and permutations thereof.

In an exemplary embodiment, the system for treating an aqueous liquid containing dissolved minerals and dissolved hydrocarbons comprises passing the aqueous liquid, or a waste water feed stream, through a warm lime softener, wherein the warm lime softener or warm lime softening system comprises a lime silo, a sodium carbonate silo and a caustic storage tank in fluid communication with a lime and soda precipitation softener vessel, which is in fluid communication with a sludge storage tank, wherein contacting the waste water feed stream with lime and sodium carbonate in the lime and soda precipitation softener vessel produces a particulate suspension that settles to produce a sludge part of which may be recycled back to the lime and soda precipitation softener vessel. The system may also further include at least one of: a cooling system in fluid communication with the lime and soda ash precipitation softener vessel comprising an air cooled heat exchanger and/or an evaporative cooler; a microfiltration system in fluid communication with the cooling system; an ion exchange resin softener system in fluid communication with the microfiltration system; a first pass reverse osmosis system in fluid communication with the ion exchange resin softener system; an air stripper in fluid communication with the first pass reverse osmosis system; a second pass reverse osmosis system in fluid communication with the air stripper system; a caustic storage tank configured to raise the pH of the waste water feed stream in the lime and soda precipitation softener vessel and/or the membrane filtration system to a pH of about 11; an acid tank in fluid communication with the effluent of the air stripper system to adjust the pH of the effluent to about 7; and combinations thereof.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION OF THE INVENTION

The present invention relates to systems and methods for treating waste water. It will be appreciated by those skilled in the art that the embodiments herein described, while illustrating certain embodiments, are not intended to so limit the invention or the scope of the appended claims. Those skilled in the art will also understand that various combinations or modifications of the embodiments presented herein can be made without departing from the scope of the invention. All such alternate embodiments are within the scope of the present invention. Similarly, while the drawings depict illustrative embodiments of devices and components in accordance with the present invention and illustrate the principles upon which the system is based, they are only illustrative and any modification of the invented features presented herein are to be considered within the scope of this invention.

As used herein and in the appended claims, the singular forms, for example, "a", "an", and "the," include the plural, unless the context clearly dictates otherwise. For example, reference to "a reverse osmosis membrane" includes a plurality of such membranes and equivalents thereof.

As used herein, "comprising," "including," "containing," "characterized by," and grammatical equivalents thereof are inclusive or open-ended terms that do not exclude additional, unrecited elements or method steps, but also includes the more restrictive terms "consisting of" and "consisting essentially of."

As used herein, "about 180° F." means a temperature range of about 140° F. to about 200° F.

As used herein, "about 90° F." means a temperature range of about 85° F. to about 95° F.

As used herein, "about 60° F." means a temperature range of about 60° F. to about 85° F.

As used herein, "a microfiltration system" means a membrane based filtration system and is used merely to facilitate discussion of the system, no lower pore size limit is intended, thus the phrase includes microfiltration, ultrafiltration, and nanofiltration systems.

Figure 1:
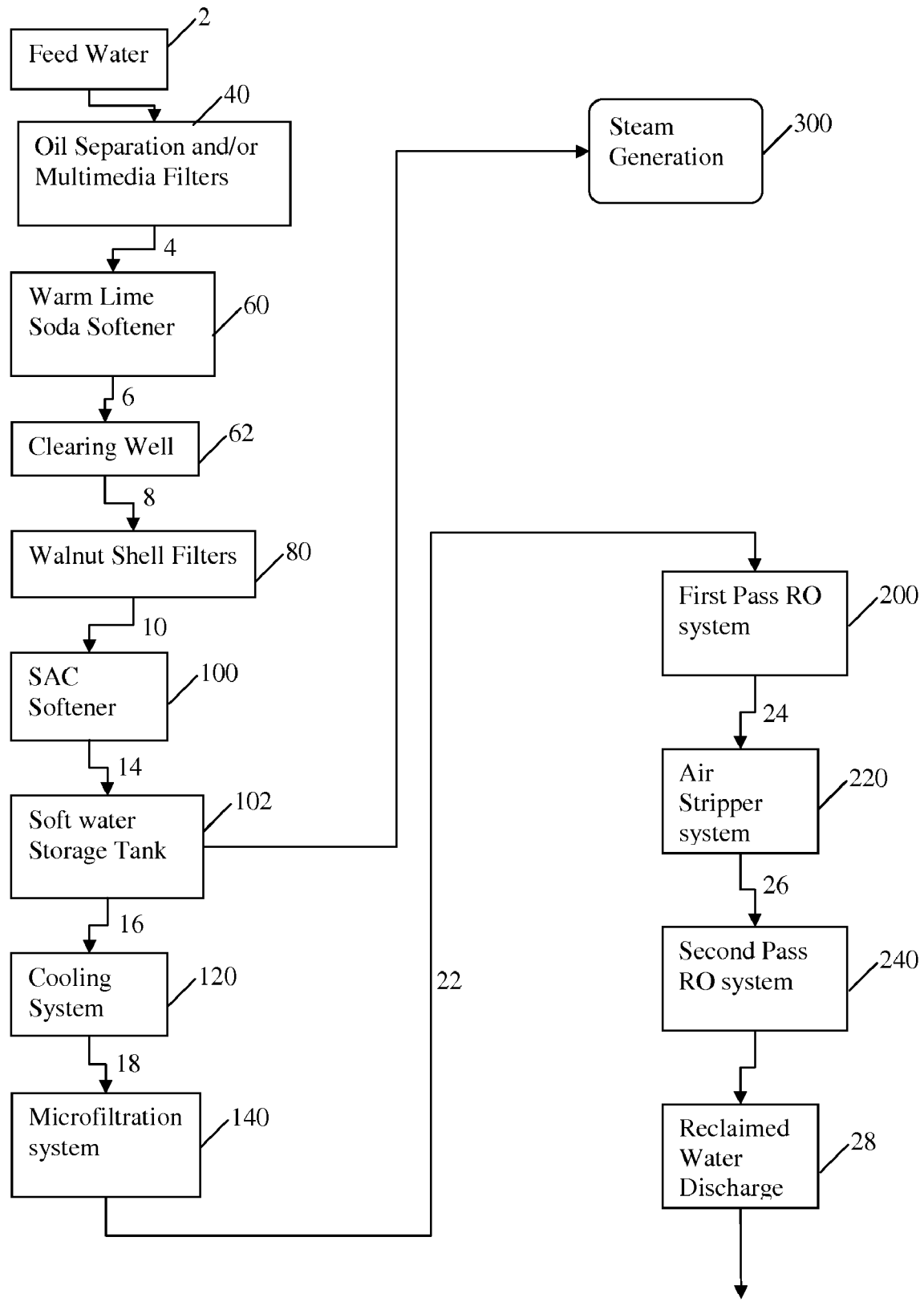
FIG. 1 is a flow chart of a method of water treatment according to an exemplary embodiment of the invention.

Referring to FIG. 1, feed water 2, or produced water is subject to oil separation and, optionally, passage through media filters 40. From the media filters 40 the oil separated feed water 4 enters a warm lime softener 60, which includes a clearing well 62, where hardness (e.g., calcium and magnesium), boron, and silica concentrations are reduced by precipitation to produce a softened feed water 6. From the warm lime softener 60, the softened feed water 6 is passed through a walnut shell filter 80 and an ion exchange resin water softener system 100 (e.g., such as a strong acid cation (SAC) exchange softener), which may include a soft water storage tank 102. The resulting softened and filtered feed water 14, 16 is next passed through a cooling unit 120 to drop the temperature of the softened and filtered feed water 14, 16 from about 180° F. to about 90° F. The cooled feed water 18 is then passed through a microfiltration system 140, which may include guard softeners 160 and/or reverse osmosis (RO) pretreatment cartridge filters 180, before contacting the first pass reverse osmosis (RO) system 200 (see FIG. 4). The first pass permeate 24 is then sent to an air stripper system 220 and then to a second pass RO system 240. The second pass RO permeate 28 is suitable surface discharge, although it may require some mineral or chemical addition and/or temperature change in order to comply with particular aspects of state and/or federal regulations, such as the California regulations concerning irrigation water.

In an exemplary embodiment, after an oil/water separation phase, which includes processes such as Induced Air Flotation (IAF) and other processes known in the art, the normal oil level in the produced water or oil separated feed water 4 is less than or equal to about 1 ppm, with occasional excursions to a maximum concentration of about 20 ppm. After the existing oil water separation process the treatment method may feed conditioning chemicals, such as a dispersant, to keep any remaining oil and grease dispersed or dissolved in the oil separated feed water 4. Media filtration 40 may optionally be used in a guard role ahead of the warm lime softener system 60. Such media filters may be operated for many weeks without any increase in differential pressure or decrease in flow. Optionally, sacrificial cartridge filters may be installed downstream of the oil/water separation phase and ahead of the warm lime softener system 60 to trap residual free oil carryover from the oil water separation process steps.

In another exemplary embodiment, a degasification system (e.g., a vacuum degasification system) may be used between an oil/water separation phase and the warm lime softener system 60. For example, carbon dioxide and hydrochloric acid may be used to condition (i.e., decrease the pH to an acidic condition, below a pH of about 7 or below about a pH of 4) feed water applied to the degasification system, thereby allowing the degasification system to remove or reduce the concentration of carbon dioxide or alkalinity, hydrogen sulfide, methane, and other volatile organics from the feed water (see U.S. Pat. Nos. 4,839,054 and 5,804,078). The degasification system may be a two stage system or a single stage system.

A vacuum degasification system may be operated at a vacuum level just a few millimeters of mercury above the vapor pressure of the water at the temperature of the water being treated. The flash to vapor may be controlled by bleeding the exhaust gases from the discharge of the vacuum pumps back into the vacuum draw lines used to evacuate the degasifier tower.

In another exemplary embodiment, an inorganic coagulant system, such as a ferric or aluminum coagulant system, may be used between an oil/water separation phase and the warm lime softener system 60, optionally the inorganic coagulant system my be combined with a degasification system (see, Enhanced Coagulation and Enhanced Precipitative Softening Guidance Manual, U.S. Environmental Protection Agency, 1999). For example, there may be an oil/water separation phase followed by a degasification system and an inorganic coagulant system, wherein the inorganic coagulant system may utilize ferric chloride, ferric sulfate, aluminum sulfate, polyaluminum chloride or other forms of iron or aluminum.

Warm lime softener systems 60 are typically constructed as either a "downflow" unit or an "upflow" unit, however, many variations in design of both units exist, but the principle of operation is well known in the art. For example, in an exemplary embodiment, the warm lime softener system 60 may be a multiple well system similar to that described in U.S. Pat. No. 4,465,597.

Figure 2:
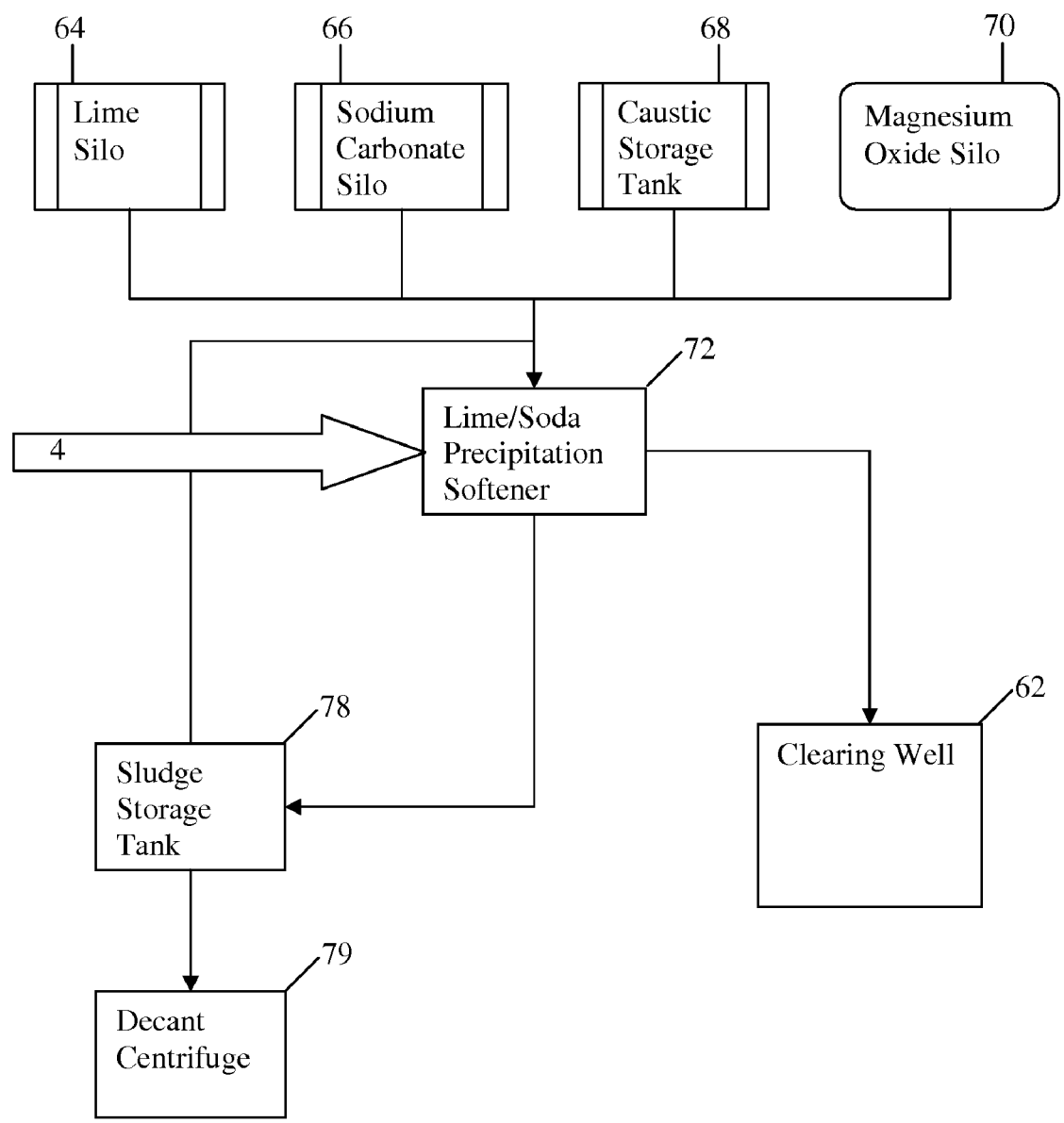
FIG. 2 is a flow chart illustrating a method of operating a warm lime softening system according to an exemplary embodiment of the invention.
Figure 3:
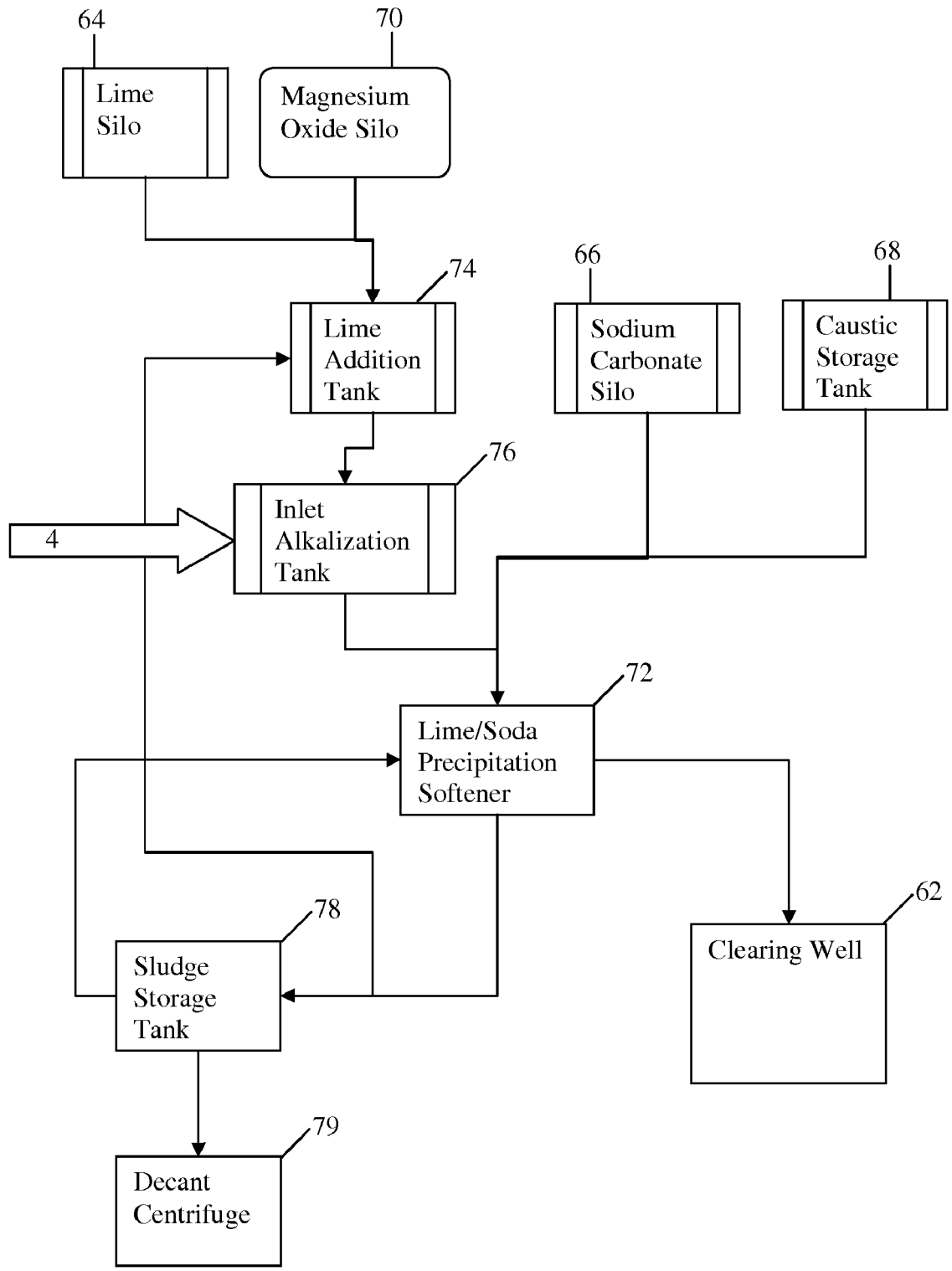
FIG. 3 is a flow chart illustrating a method of operating a warm lime softening system according to an exemplary embodiment of the invention.

Referring to FIGS. 2 and 3, generally, the warm lime softener system 60 of the invention is designed to operate at near atmospheric pressure and a temperature between about 150° F. to about 200° F. (e.g., 140-180° F., or about 180° F.). The warm lime softener 60 comprises a lime silo 64, a sodium carbonate silo 66 and a caustic storage tank 68 in fluid communication with a lime/soda precipitation softener vessel 72. Optionally, a magnesium oxide silo 70 (which may contain other known forms of magnesium) is in fluid communication with the lime/soda precipitation softener vessel 72. In an exemplary embodiment, the warm lime softener comprises a lime silo 64 in fluid communication with a lime addition tank 74, which in turn is in fluid communication with an inlet alkalization tank 76 into which lime, a carrier (such as sludge recycled from the lime/soda precipitation softener vessel 72 and/or sludge storage tank 78), and feed water 4 are mixed. The mixed feed water/lime slurry is then added to the precipitation softener vessel 72. Caustic may also be added to the lime/soda precipitation softener vessel 72 to adjust the pH as necessary. Recycling the sludge from the lime/soda precipitation softener vessel 72 into the lime addition tank 74 may promote particle growth and improve the removal of suspended solids, hardness, boron, and silica.

Any gases liberated during operation of the warm lime softener system 60 are either vented to the atmosphere or collected for further treatment as required. Although the reactions are quite rapid, typically a minimum of 1 hour of retention is used to maximize precipitation of calcium, magnesium, silica and boron, which form a sludge.

The sludge may then be dewatered, for example, by sending the sludge to a decant centrifuge 79, and the solid waste disposed of by methods known in the art.

Silica removal in a warm lime softener has been characterized more frequently in the literature as an adsorption process rather than a precipitation process. It has been shown that effective silica concentration reduction to well below a target concentration of about 50 ppm, or a 75% reduction, can be obtained by improving the formed solids contact with the water being treated. Jar testing and pilot testing of an exemplary embodiment of the invention has shown that the silica concentration can be reduced by greater than 90% removal, or less than 20 ppm, without the addition of magnesium oxide, magnesium hydroxide, or a neutral salt such as magnesium chloride or magnesium sulfate. Jar testing was also performed where all magnesium was removed from the produced water and with the recycling of spent solids the silica concentration was reduced from 200 ppm to less than 20 ppm in the absence of added magnesium. Therefore, in an exemplary embodiment of the invention the required silica concentration reduction can be accomplished with the addition of lime and sodium carbonate (soda ash) alone (i.e., without addition of magnesium). This also results in the additional advantage that the sludge does not have a higher than required content of magnesium hydroxide. In addition, since magnesium oxide is more expensive than lime, this reduces the operational costs. Furthermore, metal hydroxides such as magnesium hydroxide are fluffy, amorphous and less dense than the carbonates. Hence they settle with difficulty and decrease the areal loading in sludge dewatering operations. Testing has also shown that between 40 and 70% of the boron concentration in the produced water feed can be reduced by the described warm lime softening process utilizing the solids or sludge recycling techniques without the addition of magnesium. Boron reduction is greatest at an operating pH of between 10.5 and 11.0 with excess hardness reduced by the addition of soda ash at the very end of the warm lime soda softening process.

The sedimentation rate and the areal loading used for dewatering softening sludges containing high concentrations of magnesium decreased typically from about 50 to about 70 pounds per square foot per hour to about 20 to about 30 pounds per square foot per hour. These are typical loadings for a drum filter which works very well on these sludges. Magnesium containing suspensions have been thought to require a polymer to bring down the fines in clarification operations. However, the present invention provides a method of using the formed solids (sludge) to bring about particle size control and providing a surface for the formation of new solids, which serves to both control scaling and bring down magnesium. Thus, using the present process without magnesium feed will provide scale control, increase sedimentation rates, improve and produce the desired dewatering rates, and produce the required product water quality.

In an exemplary embodiment, the present system is designed to operate at a pH of approximately 11.2 in the warm lime softening system 60 and first pass RO system 200. The recycling of solids (sludge) enables the pH to be raised with a lower amount of lime and provides for the most efficient use of this chemical. Resulting sludge volumes have been evaluated and found to be very practical using the present process. During pilot testing sodium hydroxide was utilized extensively at variable dosages to affect the pH of the precipitation process. The use of sodium hydroxide in high dosages with even lower lime dosages created post precipitation issues and resulted in projected operating costs per blue barrel in excess of the desired target range. However, recycling of the sludge along with the addition of lime resulted in the desired pH that required addition of lower amounts of sodium hydroxide, which resulted in good precipitation and lower operating costs.

Sludge may be collected so as to permit the controlled batch treatment of the sludge (dewatering) during one eight hour shift per day, where the size of the sludge storage tank 78 is based on the daily output of sludge from the warm lime softener system 60. Equipment handling the sludge may include drives that have the necessary torque to move the expected solids concentrations.

Polymers were tested and found unnecessary during pilot testing of the warm lime softening system 60. The feeding of polymeric flocculants ahead of the microfiltration and reverse osmosis membranes in the absence of a primary coagulant may create significant operational problems. However, since it has been recognized that magnesium containing suspensions may well require a polymer to bring down the fines in clarification operations, pilot studies were conducted to show that polymer feed did not significantly improve the settling of predominantly magnesium hydroxide solids. Therefore, in other systems anionic polymers are often required to dewater magnesium hydroxide based sludges. In contrast, polymer feed may not be required for the dewatering of the sludge created by the present process, as the magnesium is believed to be effectively precipitated by adsorption on the recycled sludge.

In an exemplary embodiment, the pH of the effluent 8 from the clearing well 62 is adjusted to less than about 9.5 (e.g., 9.4), but above about 9, by addition of a 93% sulfuric acid solution (or any other mineral acid) and then passed through walnut shell filters 80. While the invention is described in terms of walnut shell filters 80, any granular media, including sand, steam-activated pecan shells, walnut shells, graded sand, graded garnet, anthracite, and combinations thereof, may be used. The oil and grease concentrations in the oil separated feed water 4 may be about 30% to about 60% of the Total Organic Carbon (TOC) concentration in the oil separated feed water 4 during normal operation. During normal operation the walnut shell filters 80 may be unnecessary, but may become more important during periods of abnormal operation when more oil is present in the oil separated feed water 4. In an exemplary embodiment, the organics present in the oil separated feed water 4 have been characterized at a pH of about 11 as dissolved volatile fatty acids (C2-C6) and dissolved naphthenic acids (C10-C20). The naphthenic acids are a family of carboxylic acid surfactants.

Oil, grease and suspended solids removal may be accomplished by filtration using sand, steam-activated pecan shells, walnut shells, graded sand, graded garnet, anthracite, alone or in any combination as the filtration media, for example, black walnut shell filters are commercially available from Petreco Process Systems (HYDROMATION®), Absolute Filtration Industries Corporation (HYDROFLOW™), and USFilter (AUTO-SHELL™). Walnut shell filters are preferred due to their improved oil coalescing surface and reduced cleaning frequency, see U.S. Pat. No. 3,992,291. Such filters may contain a combination of filter media, such as in the case of media filters or where anthracite is added to a sand filter to increase oil retention. In an exemplary embodiment, a walnut shell filter 80 is used downstream of a warm lime softener system 60 and clearing tank 62.

The SAC water softener system 100 in an exemplary embodiment of the invention is designed to further reduce or remove scale forming cations (e.g., Ca and Mg), which are replaced by sodium ions. The resin may be regenerated with NaCl at hardness breakthrough. As the pH of the feed water 10 is unchanged (e.g., remains at a pH of about 9.4) by this treatment, no degasification is needed. In addition, in an exemplary embodiment of the invention, the feed water 10 for the SAC water softener system 100 has a pH of about 9.4 which converts most or all of the residual $CO_2$ into bicarbonate that is then rejected by the first pass reverse osmosis (RO) system 200.

The softened and filtered feed water 14 from the SAC water softener system 100 may then be stored in a soft water storage tank 102, from which it may be re-used in a steam generation system 300 and reinjected underground into the oil field formation. Alternatively, the stored softened and filtered feed water 16 may be cooled, using a cooling system 120, from a temperature of about 180° F. to about 90° F. In an exemplary embodiment, the stored softened and filtered feed water 16 is sent to a cooling system 120 comprising an air cooled heat exchanger and an evaporative cooler in a closed system. In this embodiment, operation of the evaporative cooler may be made dependent on the outside air temperature, such that when the outside air temperature is sufficiently low the air cooled heat exchangers alone may be sufficient to achieve the desired temperature in the cooled feed water 18. When the outside air temperature increases to the point that the air cooled heat exchangers are no longer sufficient by themselves, the evaporative cooler may be activated to further facilitate achieving the desired temperature in the cooled feed water 18.

Obtaining Silt Density Index (SDI) measurements less than or equal to about 5.0, preferably less than or equal to about 3.0, prior to contacting the feed water with the first pass reverse osmosis (RO) system 200 may require pretreatment of the cooled feed water 18 by a microfiltration system 140. In an exemplary embodiment, treatment of the cooled feed water 18 by microfiltration is performed using an outside-in, near dead end (e.g., about a 5% bleed off), hollow fiber microfilter or ultrafilter. The hollow fibers of the microfilter may be made from polyvinylidene fluoride (PVDF). The difference between the microfiltration, ultrafiltration and nanofiltration is the nominal pore size, for example, an ultrafiltration (HFS-Type) system may have a pore size less than about 0.02 microns and a microfiltration (HFM-Type) system may have a pore size less than about 0.1 microns.

Figure 4:
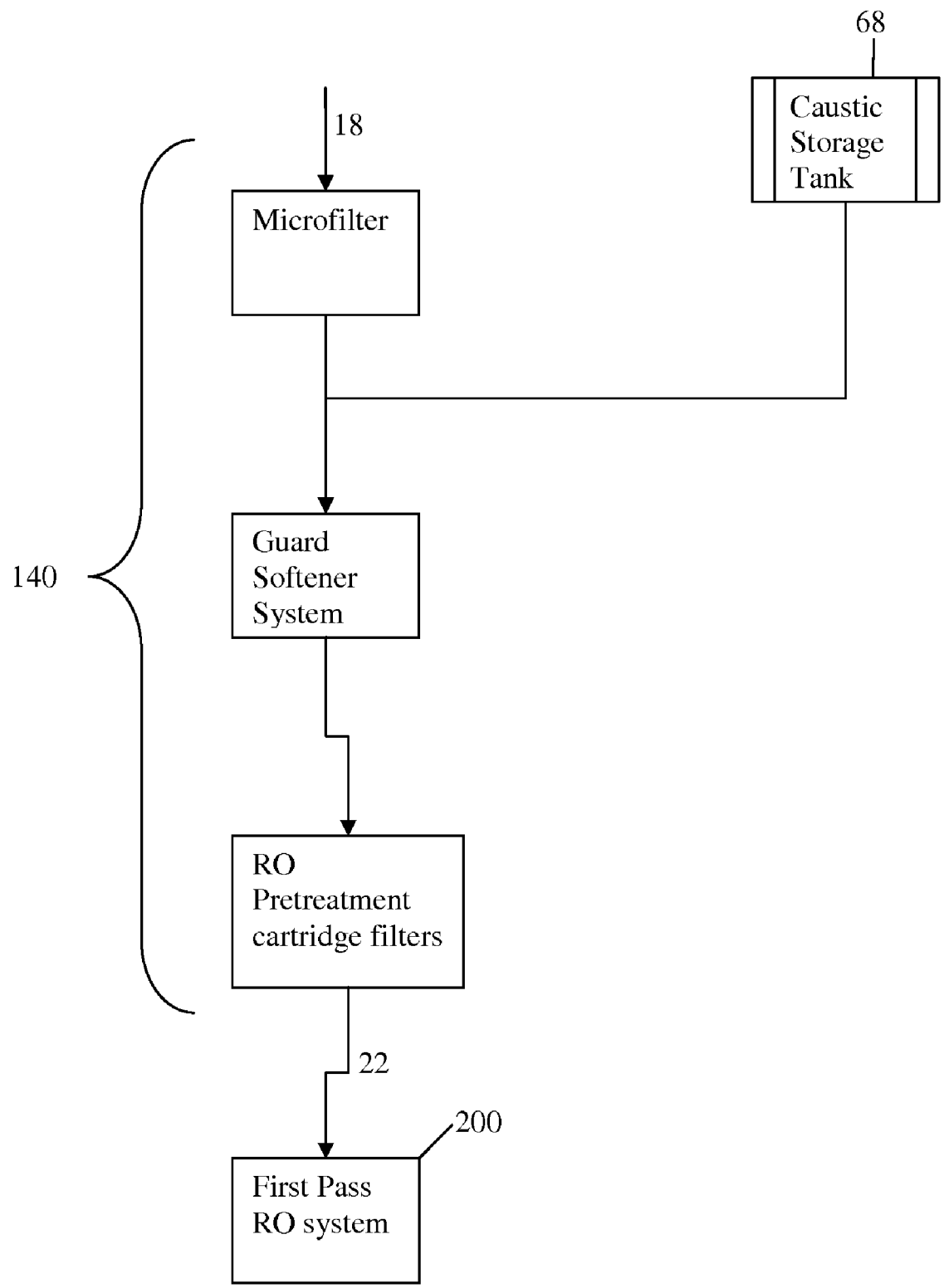
FIG. 4 is a flow chart illustrating a membrane filtration system according to an exemplary embodiment of the invention.

Referring to FIG. 4, the microfiltration system 140 may also include a guard softener 160 and/or a RO pretreatment cartridge filter 180. In an exemplary embodiment, the guard softener 160 is an ion exchange resin based softener. As will be appreciated, the phrase "guard softener" 160 is used in this exemplary embodiment since it is located downstream of the warm lime softening system 60, however, it will also be appreciated that in exemplary embodiments where the warm lime softener system 60 is omitted, the guard softener 160 will function as the primary softening system. In an exemplary embodiment, the RO pretreatment cartridge filter 180 is a conventional size exclusion filter system rated at 5.0 micron nominal serving to protect the reverse osmosis membranes from the effect of ion exchange resin beads or particles that may be released from the guard softener 160 downstream of the microfiltration system 140. For example, the RO pretreatment cartridge filter 180 may be a disposable paper filter, pleated paper filter, fiber filter, and/or wound fiber filter. In another exemplary embodiment, the microfiltration system 140 comprises an outside-in, near dead end, hollow fiber microfilter, where the microfiltration system 140 effluent is then passed through a sodium cycle ion exchange guard softener 160 and an RO pretreatment cartridge filter 180.

The microfiltration system 140 used in an exemplary embodiment consistently produced reverse osmosis feed water 22 with an SDI less than 1.0 and seldom higher than 2.0. This enabled the reverse osmosis system (200 and/or 240) to run without performance change or evidence of fouling due to particulate material during testing of the process.

Because the present system operates at high pH, the TOC content of the reverse osmosis feed water 22 did not create any damage or fouling of the reverse osmosis membranes. Removal of the TOC content by methods such as enhanced ferric chloride coagulation, oxidation with chlorine, carbon adsorption, etc. have been found to be unnecessary, which means that such pretreatments may be omitted in the present system, thereby reducing setup and operational costs. The naphthenic acids and volatile fatty acids that are rejected by the reverse osmosis membranes are soluble under the operating conditions of the invention and rejected by the charged membrane surface of the reverse osmosis membranes. Therefore, significant organic fouling of the reverse osmosis membrane did not occur, as indicated by autopsy using FTIR spectrophotometer readings of examined reverse osmosis membranes, which showed only trace deposits of organic material after 1,322 hours or 55 days of combined operation.

The first pass RO permeate 24 from the first pass RO system 200 is sent to an air stripper system 220. While the air striper system 220 in this embodiment is between the first pass RO system 200 and the second pass RO system 240, it may also be located upstream of the first pass RO system 200. Common types of air strippers include packed towers, multi-staged bubble systems, venturi eductors, and spray nozzles. Air strippers are typically used to remove volatile organics, radon, carbon dioxide, trihalomethanes, methane, and hydrogen sulfide, and may also be used to oxidize iron, for subsequent removal by filtration. In the present system the primary role of the air strippers is to remove acetone and methyl ethyl ketone (MEK or 2-butanone), with some reduction in ammonia, and to decrease the temperature of the first pass RO permeate 24 before the second pass RO system 240 and discharge of the treated water, for example, from about 90° F. to about 60° F. or within about 5° F. approach of the wet bulb temperature of the atmospheric air. Acetone and methyl ethyl ketone (MEK or 2-butanone) were discovered in the produced water feed and were not removed by the described pretreatment process ahead of the air stripper including the first pass reverse osmosis system 200.

From the air stripper system 220 the pH of the treated water is adjusted to a pH of about 7 by addition of sulfuric acid or any other desirable acid and sent to the second pass RO system 240. By lowering the pH before the second pass reverse osmosis system the rejection of the ammonium and added sulfate ions is possible as well as the further removal of the higher than expected sodium concentrations in the first pass reverse osmosis permeate due to the presence of hydroxide ion during the high pH operation.

In an exemplary embodiment, the pH of the feed water 4 is adjusted to about 11 (e.g., about 10.2 to about 11.8) during the warm lime softening process step. The pH after the warm lime softener system 60 is adjusted with sulfuric acid to about 9.4 to arrest the precipitation reactions and eliminate post-precipitation in the media filters and ion exchange softeners immediately downstream (e.g., the guard softener 160 and/or the RO pretreatment cartridge filter 180). The pH remains 9.4 until the addition of caustic prior to the first pass reverse osmosis system 200. In an exemplary embodiment, the pH is then adjusted to about 11 in the microfiltration system 140, for example, by addition of caustic between the microfilter and guard softener system 160 (FIG. 4). The pH of the first pass RO permeate 24 is at about 10.3 until addition of an acid following the air stripper system 220, which reduces the pH of the water to near neutral (e.g., between about 6.4 and about 8.4).

In another exemplary embodiment, any residual phenol from the reverse osmosis permeate may be removed by further treating the water with granular activated carbon (GAC), or other such material.

An additional advantage of the present system is that by operating at an elevated temperature and/or pH from the warm lime softener system 60 through until just prior to the second pass RO system 240, the system naturally prevents biofouling of the membranes and other equipment by preventing growth of algae and other organisms.

Example I

In an exemplary embodiment, a water treatment system as illustrated in FIG. 1 is designed. The designed flow rate of the warm lime softener system is about 2,095 gpm. The calculated Quicklime addition required is about 657.2 ppm as calcium oxide (CaO), where about 495.8 ppm is used for calcium, magnesium, and carbon dioxide removal as well as pH adjustment and about 161.4 ppm is added in excess. Since powdered Quicklime contains about 90% CAO this requires about 689.5 ppm of powdered Quicklime. The Quicklime will be slaked and diluted to a slurry between 5% and 12% by weight. The lime slurry will be circulated in a loop at a flow rate to maintain a desired pipe velocity and the required flow rate of slurry to provide the stated dosage will be metered from the described slurry flow loop.

The total calculated soda addition is about 275 ppm or about 397 gph (about 6.62 gpm), where the soda is added as a 10% wt solution. This system is designed to add soda at a maximal flow rate of 473 gph (7.88 gpm) or about 270 BPD.

The anticipated warm lime softener 72 (FIG. 3) underflow sludge to be sent on a continuous basis to the sludge storage tank 78 is between 30 and 45 gpm. The amount of sludge to be recycled to the lime addition tank 74 is to be between four and five times the underflow being removed to the sludge storage tank 78 or between about 120 and 225 gpm. This is the same flow rate of sludge that will be recycled externally back to the center well of the solids contact warm lime softener. The recycled sludge is mixed with fresh lime slurry in the lime addition tank 74 and mixed with a very high energy mixer. The recycled sludge and the fresh lime slurry flows by gravity to the inlet alkalization tank 76 where it is blended with the produced water feed utilizing a very high energy mixer. The retention time in the lime addition tank 74 will be about 20 minutes. The retention time in the inlet alkalization tank 76 will be about 10 minutes. The fresh lime, recycled solids or sludge, and produced water mixture flows by gravity to the warm lime softener vessel 72 from the inlet alkalization tank 76. Lime will be added to give the desired pH. Caustic addition will normally not occur although the capability is present to use caustic from the caustic storage tank 68 if necessary to make the pH adjustment to the desired level.

Before the effluent from the warm lime softener system 60 is run through the walnut shell filters 80, the pH of the effluent is adjusted down to less than about 9.5 (e.g., pH=9.4) by addition of sulfuric acid (93% solution). At the designed flow rate at the injection point, which is about 2,175 gpm, about 234.4 pph (215.2 ppm/hr) of $H_2SO_4$ is added. Adjusting for the concentration, this results in an addition of about 16.5 gph, using a system having a maximal flow rate of about 58 gph or 33 BPD. The pH adjusted effluent is then run through walnut shell filters with the effluent from the walnut shell filters 80 being drawn at a maximum flow rate of about 1,922 gpm or 65,912 BPD.

The effluent from the walnut shell filters 80 is sent to the SAC softener system 100 with no substantial changes in temperature or pH. The effluent from the SAC softener system 100 is drawn at a maximum flow rate of about 1,875 gpm or 64,246 BPD. The SAC softener system 100 is regenerated using an 18% brine solution. The effluent from the SAC softener system 100 and/or soft water storage tank 102 is sent to the cooling system 120 at a maximal flow rate of 1,161 gpm or 39,820 BPD for eventual reclaim. The remaining flow rate of about 730 gpm or 25,000 BPD of softened and filtered water is available for use for steam generation.

The cooling system 120 comprises three air cooled heat exchangers rated at about 387 gpm/unit and a single evaporative cooler rated at least at about 1,161 gpm/unit. The cooled effluent from the cooling system 120 is passed through four banks of microfilters rated at least at about 387 gpm/unit. The pH of the effluent from the microfilters is adjusted up to about 11. Given that the flow rate at the injection point is about 1,158 gpm and that the expected rejection at the first pass RO system 200 is about 75% with two banks treating feed (579 gpm of feed and 434 gpm of permeate each), the addition of caustic (50% solution) is calculated to be about 16.1 gph. Because of the anticipated high concentration of silica in the first pass reverse osmosis feed concentrate, an antiscalant/dispersant is fed ahead of the first pass reverse osmosis system into the feed water at a dosage recommended by the antiscalant/dispersant manufacturer.

The effluent from the first pass RO system 200 is then sent to the air stripper system 220, which removes approximately 90.2% of the acetone, 99.9% of the 2-butanone and approximately 44.3% of the ammonia. From the air stripper system 220 the pH of the effluent is lowered by addition of sulfuric acid (93%). Giving that the flow rate at the injection point is about 868 gpm, in combination with the fact that the alkalinity must be neutralized (about 9.8 ppm) and the pH dropped from about 10.3 to about 7, the addition of sulfuric acid (93% solution) is calculated to be about 1.1 gph (about 1.07 gph). The pH adjusted effluent from the air stripper system 220 is then sent to a second pass RO system 240 which is capable of producing at least 20,000 BPD of discharged reclaimed water.

Table 1 provides calculated values of various water quality parameters for noted points in the process (See FIG. 1):

| PARAMETER | WARM LIME SOFTENER INLET | CLEARING WELL OUTLET | WALNUT SHELL FILTER INLET | SAC SOFTENER OUTLET | SOFT WATER TANK OUT | FIRST PASS RO INLET | FIRST PASS RO PERMEATE | AIR STRIPPER OUTLET | SECOND PASS RO INLET | SECOND PASS RO PERMEATE |
|---|---|---|---|---|---|---|---|---|---|---|
| CALCIUM, PPM AS Ca | 56.4 | 9.3 | 9.3 | 0.10 | 0.10 | 0.10 | 0.00 | 0.00 | 0.00 | 0.00 |
| MAGNESIUM, PPM AS Mg | 18.0 | 2.8 | 2.8 | 0.02 | 0.02 | 0.02 | 0.00 | 0.00 | 0.00 | 0.00 |
| SODIUM, PPM AS Na | 463.3 | 582.6 | 582.6 | 598.5 | 598.5 | 700.3 | 55.3 | 55.3 | 55.3 | 2.21 |
| POTASSIUM, PPM AS K | 36.6 | 36.6 | 36.6 | 36.6 | 36.6 | 36.6 | 2.47 | 2.47 | 2.47 | 0.02 |
| AMMONIUM, PPM AS $NH_4$ | 17.8 | 0.0 | 0.4 | 0.4 | 0.4 | 0.0 | 0.0 | 0.0 | 10.0 | 0.20 |
| BARIUM, PPM AS Ba | 0.054 | 0.0 | 0.0 | 0.0 | 0.0 | 0.0 | 0.0 | 0.0 | 0.0 | 0.0 |
| STRONTIUM, PPM AS Sr | 1.41 | 0.0 | 0.0 | 0.0 | 0.0 | 0.0 | 0.0 | 0.0 | 0.0 | 0.0 |
| ALKALINITY, PPM AS $HCO_3$ | 648.7 | 21 | 230 | 230 | 230 | 21 | 0.24 | 0.24 | 0.31 | 0.04 |
| ALKALINITY, PPM AS $CO_3$ | 0.0 | 283 | 78 | 78 | 78 | 283 | 0.01 | 0.01 | 0.00 | 0.00 |
| ALKALINITY, PPM AS OH | 0.0 | 17.0 | 0.43 | 0.43 | 0.43 | 17.0 | 3.4 | 3.4 | 0.0 | 0.0 |
| CHLORIDE, PPM AS Cl | 575.2 | 575.2 | 575.2 | 575.2 | 575.2 | 575.2 | 2.17 | 2.17 | 2.17 | 0.68 |
| SULFATE, PPM AS $SO_4$ | 4.7 | 4.7 | 215.5 | 215.5 | 215.5 | 215.5 | 0.14 | 0.14 | 34.5 | 2.72 |
| NITRATE, PPM AS $NO_3$ | 0.0 | 0.0 | 0.0 | 0.0 | 0.0 | 0.0 | 0.0 | 0.0 | 0.0 | 0.0 |
| FLOURIDE, PPM AS F | 2.4 | 2.4 | 2.4 | 2.4 | 2.4 | 2.4 | 0.0 | 0.0 | 0.0 | 0.0 |
| ACETONE, PPM AS $C_3H_6O$ | 5.0 | 5.0 | 5.0 | 5.0 | 5.0 | 5.0 | 5.0 | 0.489 | 0.489 | 0.489 |
| 2-BUTANONE, PPM AS $C_4H_8O$ | 1.0 | 1.0 | 1.0 | 1.0 | 1.0 | 1.0 | 1.0 | 0.001 | 0.001 | 0.001 |
| SILICA, PPM AS $SiO_2$ | 211 | 50 | 50 | 50 | 50 | 50 | 0.64 | 0.64 | 0.64 | 0.01 |
| TOC, PPM AS C | 200 | 200 | 200 | 200 | 200 | 200 | 8 | 8 | 8 | 0.5 |
| AMMONIA, PPM AS N—$NH_3$ | 0.0 | 16.8 | 16.4 | 16.4 | 16.4 | 16.8 | 16.8 | 9.4 | 0.0 | 0.0 |
| BORON, PPM AS B | 7.32 | 7.32 | 7.32 | 7.32 | 7.32 | 7.32 | 0.16 | 0.16 | 0.16 | 0.11 |
| SULFIDE, PPM AS S | 24.4 | 24.4 | 24.4 | 24.4 | 24.4 | 24.4 | 0.10 | 0.10 | 0.10 | 0.0 |
| CARBON DIOXIDE, PPM $CO_2$ | 262.5 | 0.0 | 0.10 | 0.10 | 0.10 | 0.0 | 0.0 | 0.0 | 0.0 | 0.0 |
| TDS, PPM | 2,036 | 1,788 | 2,006 | 1,998 | 1,998 | 2,127 | 88 | 88 | 161 | 10 |
| TEMPERATURE, °F. | 180 | 180 | 180 | 180 | 180 | 90 | 90 | 60 | 60 | 60 |
| pH | 6.4 | 11.0 | 9.4 | 9.4 | 9.4 | 11.0 | 10.27 | 10.27 | 7.0 | 7.0 |

All references, including publications, patents, and patent applications, cited herein are hereby incorporated by reference to the same extent as if each reference were individually and specifically indicated to be incorporated by reference and were set forth in its entirety herein.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of treating an aqueous liquid containing dissolved minerals and dissolved hydrocarbons, the method comprising:

passing an aqueous liquid containing dissolved minerals and dissolved hydrocarbons through a warm lime softener such that a pH of about 11 is reached in the warm lime softener;

adjusting the pH of an effluent from the warm lime softener to a pH of between about 9 and about 9.6 by adding a mineral acid;

passing the effluent from the warm lime softener through a micro filter prior to contacting a reverse osmosis system; and treating the permeate from the reverse osmosis system to remove ammonia.

2. The method according to claim 1, further comprising treating a permeate from the reverse osmosis system with granular activated carbon.

3. The method according to claim 2, wherein the aqueous liquid in the warm lime softener is at a temperature of between about 140 and about 210° F.

4. The method according to claim 2, further comprising an ion exchange based softener in fluid communication with the micro filter.

5. The method according to claim 1, further comprising neutralizing the pH of the effluent from the air stripper system to a pH of about 7.

6. The method according to claim 1, further comprising recycling at least a part of a precipitate sludge produced by the warm lime softener back into the warm lime softener.

7. A method of treating an aqueous liquid containing dissolved minerals and dissolved hydrocarbons, the method comprising:
passing an aqueous liquid containing dissolved minerals and dissolved hydrocarbons through a warm lime softener such that a pH of about 11 is reached in the warm lime softener;
adjusting the pH of an effluent from the warm lime softener to a pH of between about 9 and about 9.6 by adding a mineral acid;
passing the effluent from the warm lime softener through a micro filter prior to contacting a reverse osmosis system; and
raising the pH of an effluent from the micro filter to about a pH of 11 and adding an antiscalant/dispersant for silica scale prevention before contacting the reverse osmosis system.

8. The method according to claim 7, further comprising passing the effluent from the warm lime water softener through a granular filter media or an ion exchange softener prior to passing through the micro filter.

9. The method according to claim 8, wherein the granular filter media comprises walnut shells.

10. The method according to claim 7, further comprising passing a permeate from the reverse osmosis system through a second reverse osmosis system following reducing the temperature of the permeate to within about 5° F. approach of the wet bulb temperature of atmospheric air.

11. A method of treating an aqueous liquid containing dissolved minerals and dissolved hydrocarbons, the method comprising:
passing an aqueous liquid containing dissolved minerals and dissolved hydrocarbons through a warm lime softener such that a pH of about 11 is reached in the warm lime softener;
adjusting the pH of an effluent from the warm lime softener to a pH of between about 9 and about 9.6 by adding a mineral acid;
passing the effluent from the warm lime softener through a micro filter prior to contacting a reverse osmosis system; and
changing the temperature of a permeate from the reverse osmosis system prior to surface discharge.

12. A waste water treatment system comprising:
a waste water feed stream;
a warm lime softening system in fluid communication with the waste water feed stream, wherein the warm lime softening system comprises a lime silo, a sodium carbonate silo and a caustic storage tank in fluid communication with a lime and soda precipitation softener vessel;
a sludge storage tank in fluid communication with the lime and soda precipitation softener vessel, wherein contacting the waste water feed stream with lime and sodium carbonate in the lime and soda precipitation softener vessel produces a particulate suspension that settles to produce a sludge that is recycled back to the lime and soda precipitation softener vessel;
a microfiltration system in fluid communication with the lime and soda precipitation softener vessel;
a first pass reverse osmosis system in fluid communication with the microfiltration system; and
an ammonia removal system in fluid communication with the first pass reverse osmosis system.

13. The system of claim 12, wherein the ammonia removal system comprises an air stripper system.

14. The system of claim 13, further comprising a second pass reverse osmosis system in fluid communication with the air stripper system.

15. The system of claim 12, further comprising a granular activated carbon system in fluid communication with an effluent from a reverse osmosis system.

16. The system of claim 12, further comprising a cooling system in fluid communication with an effluent from a reverse osmosis system.

17. The system of claim 12, further comprising an additional treatment system selected from the group consisting of a cooling system in fluid communication with the lime and soda ash precipitation softener vessel comprising an air cooled heat exchanger and/or an evaporative cooler; an ion exchange resin softener system in fluid communication with the microfiltration system; a caustic storage tank configured to raise the pH of the waste water feed stream in the lime and soda precipitation softener vessel to a pH of about 11; an acid tank in fluid communication with an effluent from the air stripper system configured to adjust the pH of the effluent to about 7; a degasification system in fluid communication with the warm lime softening system; an inorganic coagulant system in fluid communication with the warm lime softening system; and combinations thereof.

* * * * *